United States Patent
Wang et al.

(10) Patent No.: US 12,026,541 B2
(45) Date of Patent: Jul. 2, 2024

(54) METHOD FOR APPLET PAGE RENDERING, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Ning Wang, Beijing (CN); Fang Zhan, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/773,874

(22) PCT Filed: May 8, 2021

(86) PCT No.: PCT/CN2021/092352
§ 371 (c)(1),
(2) Date: Jun. 30, 2022

(87) PCT Pub. No.: WO2022/134428
PCT Pub. Date: Jun. 30, 2022

(65) Prior Publication Data
US 2023/0359483 A1    Nov. 9, 2023

(30) Foreign Application Priority Data

Dec. 25, 2020 (CN) .................. 202011573045.X

(51) Int. Cl.
*G06F 9/48* (2006.01)
(52) U.S. Cl.
CPC ...................... *G06F 9/48* (2013.01)

(58) Field of Classification Search
None
See application file for complete search history.

(56) References Cited

U.S. PATENT DOCUMENTS

| 2006/0212454 A1 | 9/2006 | Behl et al. |
| 2013/0007107 A1 | 1/2013 | Behl |

(Continued)

FOREIGN PATENT DOCUMENTS

| CN | 106598655 A | 4/2017 |
| CN | 106990946 A | 7/2017 |

(Continued)

OTHER PUBLICATIONS

International Search Report for the International Patent Application No. PCT/CN2021/092352, mailed Sep. 24, 2021, 5 pages.

(Continued)

*Primary Examiner* — Craig C Dorais
(74) *Attorney, Agent, or Firm* — KDW Firm PLLC

(57) ABSTRACT

Provided are a method and apparatus for applet page rendering, an electronic device and a storage medium. The method for applet page rendering includes steps described below. Original incremental rendering is performed on an applet page based on a pre-obtained first drawing result of the applet page to obtain an original incremental rendering result of the applet page. Rendering is performed on the applet page based on the pre-obtained first drawing result of the applet page, the original incremental rendering result of the applet page and a pre-obtained initial incremental rendering result of the applet page.

15 Claims, 4 Drawing Sheets

(56) References Cited

U.S. PATENT DOCUMENTS

| | | | |
|---|---|---|---|
| 2013/0144928 A1* | 6/2013 | Gittelman | H04L 67/10 |
| | | | 709/201 |
| 2019/0213019 A1 | 7/2019 | Hu | |
| 2020/0089779 A1 | 3/2020 | Debay | |
| 2021/0216700 A1* | 7/2021 | Li | G06F 40/103 |

FOREIGN PATENT DOCUMENTS

| | | |
|---|---|---|
| CN | 107451181 A | 12/2017 |
| CN | 108804164 A | 11/2018 |
| CN | 109933385 A | 6/2019 |
| CN | 110659098 A | 1/2020 |
| CN | 110704136 A | 1/2020 |
| CN | 111552473 A | 8/2020 |
| CN | 111580924 A | 8/2020 |
| CN | 112540806 A | 3/2021 |
| KR | 20150122239 A | 10/2015 |

OTHER PUBLICATIONS

Author Unknown., "Performance optimization added page" Annoucement—Baidu small program technical team—dated May 26, 2020, 7 pages.

Supplemental Search Report for Chinese Application No. 202011573045X, dated Jun. 7, 2021, 8 pages.

First Office Action for Japanese Application No. 2022-524184, mailed Jul. 4, 2023, 7 pages.

1 Korean Office Action issued in Korean Application No. 10-2022-7014668, mailed Apr. 23, 2024, 9 pages.

* cited by examiner

METHOD FOR APPLET PAGE RENDERING, ELECTRONIC DEVICE AND STORAGE MEDIUM

CROSS-REFERENCES TO RELATED APPLICATIONS

This application is a national stage application filed under 35 U.S.C. 371 based on International Patent Application No. PCT/CN2021/092352, filed on May 8, 2021, which claims priority to Chinese Patent Application No. 202011573045.X filed with the China National Intellectual Property Administration (CNIPA) on Dec. 25, 2020, the disclosures of which are incorporated herein by reference in their entireties.

TECHNICAL FIELD

The present application relates to the field of internet technologies, for example, to applet technologies, such as a method and apparatus for applet page rendering, an electronic device and a storage medium.

BACKGROUND

In the development model of applets, developers may register fixed callback functions for applications (Apps) and pages, the applets will trigger and run the callback functions registered by the developers in accordance with established rules, and the callback functions form life cycles of the applets. The applets have fixed life cycles at both an App level and a page level. For the page-level life cycles, a monitored page loading function (onLoad), a monitored page display function (onShow), a monitored page initial rendering completion function (OnReady) and a monitored page unloading function (onUnload) are mainly included in the industry. When an applet page is loaded for the first time, the applet framework will execute, in the order of onLoad, onShow and onReady, callback functions of these three life cycles.

When the page is loaded for the first time, it is generally necessary to initiate a network request and other related operations in the first life cycle function to obtain data that the current page needs to display, and call the setData application programming interface (API) for rendering data in the applet to perform data rendering, and finally display the complete content on the page. In the above manner, the network request will be initiated in the life cycle of onLoad, but onLoad needs to be triggered to execute after loading and rendering of the initial data of the page, that is, only after the rendering thread completes the first drawing and returns the drawing result to the logical thread, the logical thread will trigger and execute onLoad, resulting in a relatively-late triggering occasion of onLoad, seriously slowing down the final rendering of the page content, and affecting the user experience.

SUMMARY

The present application provides a method-for applet page rendering, an electronic device and a storage medium, which can greatly accelerate the loading of an applet page, improve the page performance and optimize the user experience.

A method for applet page rendering is provided and includes the steps described below.

Original incremental rendering is performed on an applet page based on a pre-obtained first drawing result of the applet page to obtain an original incremental rendering result of the applet page.

Rendering is performed on the applet page based on the pre-obtained first drawing result of the applet page, the original incremental rendering result of the applet page and a pre-obtained initial incremental rendering result of the applet page.

An electronic device is further provided.

The electronic device includes at least one processor and a memory communicatively connected to the at least one processor. The memory is configured to store instructions executable by the at least one processor, and the instructions are executed by the at least one processor to cause the at least one processor to perform the steps described below.

Original incremental rendering is performed on an applet page based on a pre-obtained first drawing result of the applet page to obtain an original incremental rendering result of the applet page.

Rendering is performed on the applet page based on the pre-obtained first drawing result of the applet page, the original incremental rendering result of the applet page and a pre-obtained initial incremental rendering result of the applet page.

A non-transitory computer-readable storage medium is further provided. The storage medium stores computer instructions for causing a computer to perform the steps described below.

Original incremental rendering is performed on an applet page based on a pre-obtained first drawing result of the applet page to obtain an original incremental rendering result of the applet page.

Rendering is performed on the applet page based on the pre-obtained first drawing result of the applet page, the original incremental rendering result of the applet page and a pre-obtained initial incremental rendering result of the applet page.

DETAILED DESCRIPTION

Example embodiments of the present application, including details of embodiments of the present application, are described hereinafter in conjunction with the drawings to facilitate understanding. The example embodiments are merely illustrative. Description of well-known functions and constructions is omitted hereinafter.

Embodiment One

Figure 1:
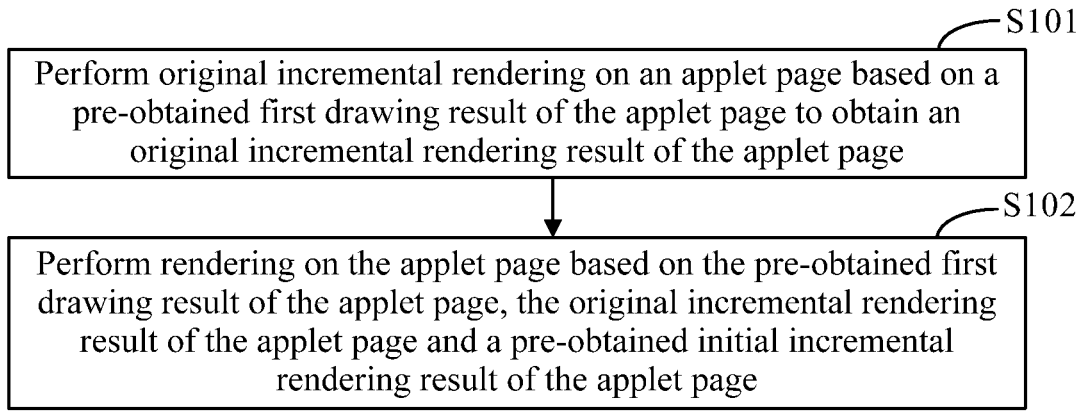
FIG. 1 is a flowchart of a method for applet page rendering according to an embodiment of the present application.

FIG. 1 is a flowchart of a method for applet page rendering according to an embodiment of the present application. The method may be executed by an apparatus for applet page rendering or an electronic device. The apparatus or the electronic device may be implemented as software and/or hardware. The apparatus or the electronic device may be integrated in any smart device having a network communication function. As shown in FIG. 1, the method for applet page rendering may include steps described below.

In step S101, original incremental rendering is performed on an applet page based on a pre-obtained first drawing result of the applet page to obtain an original incremental rendering result of the applet page.

In this step, an electronic device may perform original incremental rendering on an applet page based on a pre-obtained first drawing result of the applet page to obtain an original incremental rendering result of the applet page. The electronic device may generate a message for triggering the original incremental rendering on the applet page based on the pre-obtained first drawing result of the applet page, and perform original incremental drawing and rendering on the applet page based on the message for triggering the original incremental rendering on the applet page to obtain the original incremental rendering result of the applet page.

In a specific embodiment of the present application, before the original incremental rendering is performed on the applet page based on the pre-obtained first drawing result of the applet page to obtain the original incremental rendering result of the applet page, the electronic device may further pre-obtain a first drawing result of the applet page. The electronic device may load logical codes and a page style file of the applet page in response to an instruction of a user to open the applet page to obtain a loading result of the logical codes of the applet page and a loading result of the page style file of the applet page, then extract initial data for rendering the applet page from the loading result of the logical codes of the applet page, and perform, based on the loading result of the page style file of the applet page and the initial data for rendering the applet page, first drawing on the applet page to obtain the first drawing result of the applet page.

The underlying framework of the applet is a dual-thread architecture, and the dual-thread architecture includes a logical thread and a rendering thread. The logical thread is used for executing codes written by the developer of the applet; and the rendering thread is used for rendering and displaying content that is visible to the user. After the applet is started, the underlying framework of the applet follows rules to trigger life cycles of the applet page, where the life cycles contain the codes written by the developer. In a specific embodiment of the present application, the electronic device may perform the first drawing on the applet page through the rendering thread in response to the instruction of the user to open the applet page to obtain the first drawing result of the applet page. The electronic device may load the logical codes and the page style file of the applet page respectively through the logical thread and the rendering thread to obtain the loading result of the logical codes of the applet page and the loading result of the page style file of the applet page, extract the initial data for rendering the applet page from the loading result of the logical codes of the applet page through the logical thread, then send the initial data for rendering the applet page to the rendering thread through the logical thread, and perform the first drawing on the applet page through the rendering thread based on the loading result of the page style file of the applet page and the initial data for rendering the applet page to obtain the first drawing result of the applet page.

In step S102, rendering is performed on the applet page based on the pre-obtained first drawing result of the applet page, the original incremental rendering result of the applet page and a pre-obtained initial incremental rendering result of the applet page.

In this step, the electronic device may perform rendering on the applet page based on the pre-obtained first drawing result of the applet page, the original incremental rendering result of the applet page and a pre-obtained initial incremental rendering result of the applet page. In the present application, codes originally executed in onLoad are divided into two parts, that is, codes retained in onLoad and codes pre-executed in onInit. The codes pre-executed in onInit may be executed independently of the first drawing result, while the codes retained in onLoad may only be executed depending on the first drawing result. Therefore, in the present application, the codes whose execution does not depend on the first drawing result may be pre-executed, so that it is not necessary to put the codes whose execution depends on the first drawing result and the codes whose execution does not depend on the first drawing result both in onLoad to execute. In this way, compared with the related art, the time for page rendering can be shortened, and the loading efficiency can be improved in the present application.

According to the method for applet page rendering provided by the embodiment of the present application, original incremental rendering is performed on an applet page based on a pre-obtained first drawing result of the applet page to obtain an original incremental rendering result of the applet page; and then rendering is performed on the applet page based on the pre-obtained first drawing result of the applet page, the original incremental rendering result of the applet page and a pre-obtained initial incremental rendering result of the applet page. That is to say, in the present application, an initial incremental rendering result of the applet page may be pre-obtained, and then the rendering is performed on the applet page based on the pre-obtained first drawing result of the applet page, the original incremental rendering result of the applet page and the initial incremental rendering result of the applet page. In the present application, a function onInit is added to life cycles composed of onLoad, onShow, onReady and onUnload. Through onInit, part of the codes in onLoad can be pre-executed, without having to put codes whose execution depends on the first drawing result and codes whose execution does not depend on the first drawing result both in onLoad, while in a method for applet page rendering without adding the function onInit, the codes whose execution depends on the first drawing result and the codes whose execution does not depend on the first drawing result are both put in onLoad to execute. In the present application, the technical means is adopted in which the codes whose execution does not depend on the first drawing result is pre-executed through onInit, so that the problem in the related art is solved that only after the rendering thread completes first drawing and returns the drawing result to the logical thread, the logical thread will trigger and execute onLoad, resulting in a relatively-late triggering occasion of onLoad, seriously slowing down the final rendering of the page content, and affecting the user experience. According to the technical solution provided by the present application, the loading of the applet page is greatly accelerated, the page performance is improved, and the user experience is optimized. In addition, the technical solution of the embodiment of the present application is simple and convenient to implement, convenient to popularize, and have a wider range for application.

Embodiment Two

Figure 2:
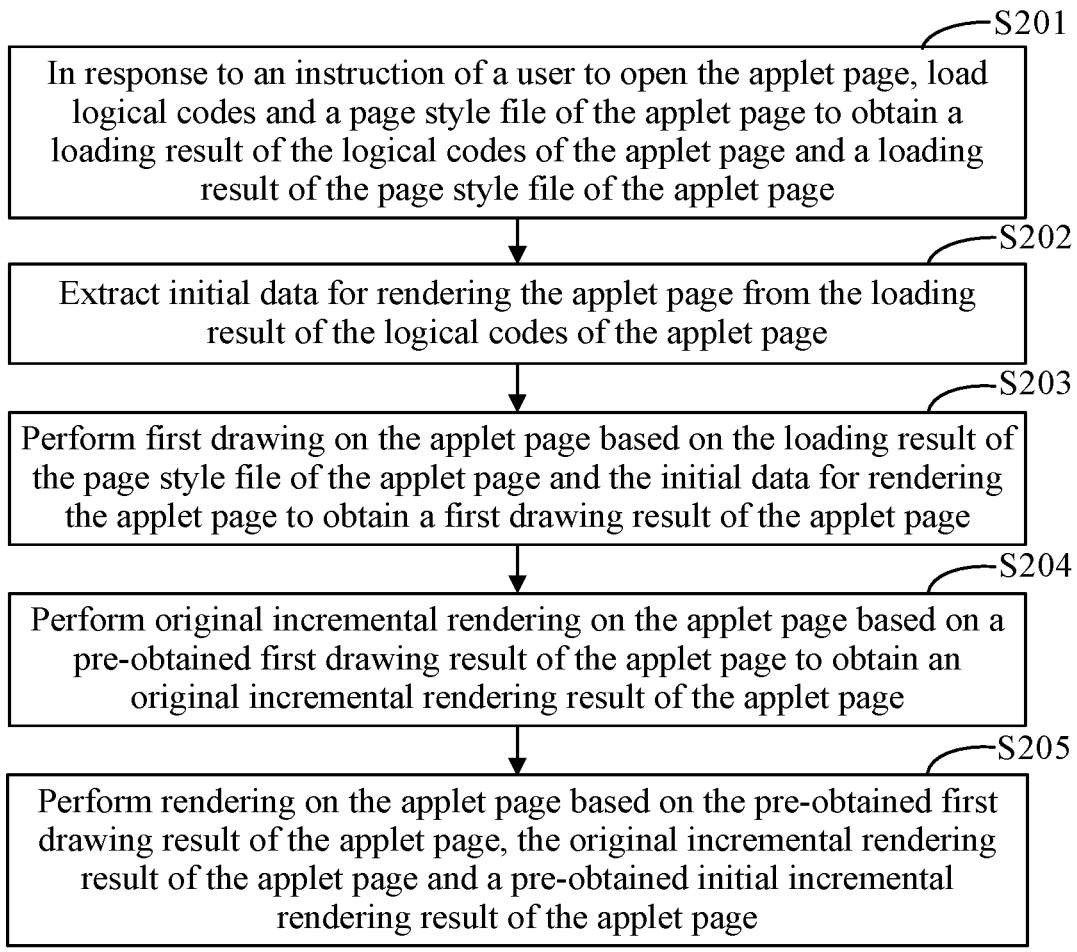
FIG. 2 is a flowchart of a method for applet page rendering according to an embodiment of the present application.

FIG. 2 is a flowchart of a method for applet page rendering according to an embodiment of the present application. The method for applet page rendering is illustrated based on the preceding technical solution and may be combined with the preceding optional embodiment. As shown in FIG. 2, the method for applet page rendering may include steps described below.

In step S201, in response to an instruction of a user to open the applet page, logical codes and a page style file of the applet page are loaded to obtain a loading result of the logical codes of the applet page and a loading result of the page style file of the applet page.

In this step, the electronic device loads logical codes and a page style file of the applet page in response to an instruction of a user to open the applet page to obtain a loading result of the logical codes of the applet page and a loading result of the page style file of the applet page. The electronic device may load the logical codes and the page style file of the applet page through the logical thread and the rendering thread in response to the instruction of the user to open the applet page to obtain the loading result of the logical codes of the applet page and the loading result of the page style file of the applet page. The page style file of the applet page may include at least a template and a style file of the loaded page. That is, after the user clicks the applet, the electronic device may load the logical codes of the applet page through the logical thread to obtain the loading result of the logical codes of the applet page, and load the template and the style file of the applet page through the rendering thread to obtain a loading result of the template and the style file of the applet page.

In step S202, initial data for rendering the applet page is extracted from the loading result of the logical codes of the applet page.

In this step, the electronic device may extract initial data for rendering the applet page from the loading result of the logical codes of the applet page. The electronic device may extract the initial data for rendering the applet page from the loading result of the logical codes of the applet page through the logical thread, and send the initial data for rendering the applet page to the rendering thread through the logical thread. The electronic device may extract the initial data (initData) for rendering the applet page from codes of onInit, and send the initial data (initData) to the rendering thread through the logical thread.

In step S203, first drawing is performed on the applet page based on the loading result of the page style file of the applet page and the initial data for rendering the applet page to obtain a first drawing result of the applet page.

In this step, the electronic device may perform first drawing on the applet page based on the loading result of the page style file of the applet page and the initial data for rendering the applet page to obtain a first drawing result of the applet page. The electronic device may perform the first drawing on the applet page through the rendering thread based on the loading result of the page style file of the applet page and the initial data for rendering the applet page to obtain the first drawing result of the applet page. After receiving initData sent by the logical thread through the rendering thread, the electronic device performs the first drawing on the applet page through the rendering thread to obtain the first drawing result of the applet page. Since the occasion of onInit is very early, when setData is issued during the life cycle of onInit to the rendering thread, the rendering thread may not have completed the first drawing, so that a problem exists that setData is out of order. Therefore, callback functions and data in setData must be in one-to-one correspondence, and the execution order needs to be strictly ensured.

setData is the application programming interface (API) of the applet, a first parameter may be used for feeding data, and a second parameter may be used for feeding a callback function, indicating that the callback function will be executed immediately after this time of setData rendering is completed. Since the execution order of setData needs to be strictly ensured, in the present application, the mechanism that the setData causes incremental rendering needs to be optimized. The optimization manner is to set a cache queue in the rendering thread. The cache queue is a FIFO data structure, and the rendering thread will firstly determine the rendering state of the page when receiving all the setData. If the first rendering is completed, the rendering thread will send a message to the cache queue, and the cached setData information in the cache queue will be excluded and executed in order, so as to achieve the ordered incremental drawing and rendering.

Page-level life cycles provided by the present application may include: onInit, onLoad, onShow, onReady and onUnload. The logical thread sends a setData message respectively to the rendering thread with regard to each of the preceding functions, and the rendering thread performs incremental drawing and rendering on the applet page respectively after receiving each setData message. With regard to each of the preceding functions, the logical thread will acquire data respectively, then encapsulate the acquired data in a setData message, and send the setData message to the rendering thread. For example, with regard to onInit, the logical thread initiates a network request to a server corresponding to onInit, and then the server corresponding to onInit returns data of onInit to the logical thread; with regard to onLoad, the logical thread initiates a network request to a server corresponding to onLoad, and then the server corresponding to onLoad returns data of onLoad to the logical thread.

In a specific embodiment of the present application, codes originally executed in onLoad are divided into two parts, that is, codes retained in onLoad and codes pre-executed in onInit. The codes pre-executed in onInit can be executed independently of the first drawing result, while the codes retained in onLoad can only be executed depending on the first drawing result. In the present application, the codes whose execution does not depend on the first drawing result may be pre-executed, so that it is not necessary to put the codes whose execution depends on the first drawing result and the codes whose execution does not depend on the first drawing result both in onLoad to execute. That is to say, onInit, when executing the codes, does not receive the information that the rendering thread completes the first drawing, so that some limitations exist to executing the codes in onInit life cycle compared with executing codes in onLoad. The main limitation is that no API that depends on view contents can be called. These APIs include and are not limited to: searching a subcomponent in a component (selectComponent), searching all subcomponents in a component (selectAllComponents), creating a view query object (createSelectorQuery), getting the context object of a map component on a page (createMapContext), getting the context object of a camera component on a page (createCameraContext), getting the context object of a painting component on a page (createCanvasContext).

In a specific embodiment of the present application, after the initial data for rendering the applet page is extracted from the loading result of the logical codes of the applet page through the logical thread, the electronic device may further generate a message for triggering initial incremental rendering on the applet page through the logical thread and send the message for triggering the initial incremental rendering on the applet page to the rendering thread through the logical thread, so that the rendering thread performs initial incremental drawing and rendering on the applet page based on the message for triggering the initial incremental rendering on the applet page to obtain an initial incremental rendering result corresponding to a monitored page initial function. When generating the message for triggering the initial incremental rendering on the applet page through the logical thread, the electronic device may acquire data for generating the message for triggering the initial incremental rendering on the applet page in a server, and then generate the message for triggering the initial incremental rendering on the applet page based on the data for generating the message for triggering the initial incremental rendering on the applet page. The electronic device may trigger and execute the monitored page initial function through the logical thread to obtain an execution result of the monitored page initial function, then acquire, based on the execution result of the monitored page initial function, the data for generating the message for triggering the initial incremental rendering on the applet page in a server corresponding to the monitored page initial function, and encapsulate the data for generating the message for triggering the initial incremental rendering on the applet page and a pre-determined callback function corresponding to the monitored page initial function to generate the message for triggering the initial incremental rendering on the applet page.

In a specific embodiment of the present application, in a case where the first drawing result of the applet page is not obtained when the message for triggering the initial incremental rendering on the applet page is received, the electronic device may send the message for triggering the initial incremental rendering on the applet page to a cache queue, and perform the initial incremental drawing and rendering on the applet page based on the cache queue to obtain the initial incremental rendering result of the applet page. In a case where the first drawing result of the applet page is obtained when the message for triggering the initial incremental rendering on the applet page is received, the electronic device may directly perform the initial incremental drawing and rendering on the applet page based on the message for triggering the initial incremental rendering on the applet page to obtain the initial incremental rendering result of the applet page. In a case where the first drawing result of the applet page is not obtained when the message for triggering the initial incremental rendering on the applet page is received through the rendering thread, the electronic device may send the message for triggering the initial incremental rendering on the applet page to a cache queue of the rendering thread, so that the rendering thread performs the initial incremental drawing and rendering on the applet page based on the cache queue to obtain the initial incremental rendering result of the applet page. In a case where the first drawing result of the applet page is obtained when the message for triggering the initial incremental rendering on the applet page is received through the rendering thread, the electronic device may directly send the message for triggering the initial incremental rendering on the applet page to the rendering thread, so that the rendering thread performs the initial incremental drawing and rendering on the applet page based on the message for triggering the initial incremental rendering on the applet page to obtain the initial incremental rendering result of the applet page.

In step S204, original incremental rendering is performed on the applet page based on a pre-obtained first drawing result of the applet page to obtain an original incremental rendering result of the applet page.

In this step, the electronic device may perform original incremental rendering on the applet page based on a pre-obtained first drawing result of the applet page to obtain an original incremental rendering result of the applet page. The electronic device may generate a message for triggering the original incremental rendering on the applet page based on the pre-obtained first drawing result of the applet page, and then perform original incremental drawing and rendering on the applet page based on the message for triggering the original incremental rendering on the applet page to obtain the original incremental rendering result of the applet page.

In step S205, rendering is performed on the applet page based on the pre-obtained first drawing result of the applet page, the original incremental rendering result of the applet page and a pre-obtained initial incremental rendering result of the applet page.

Figure 3:
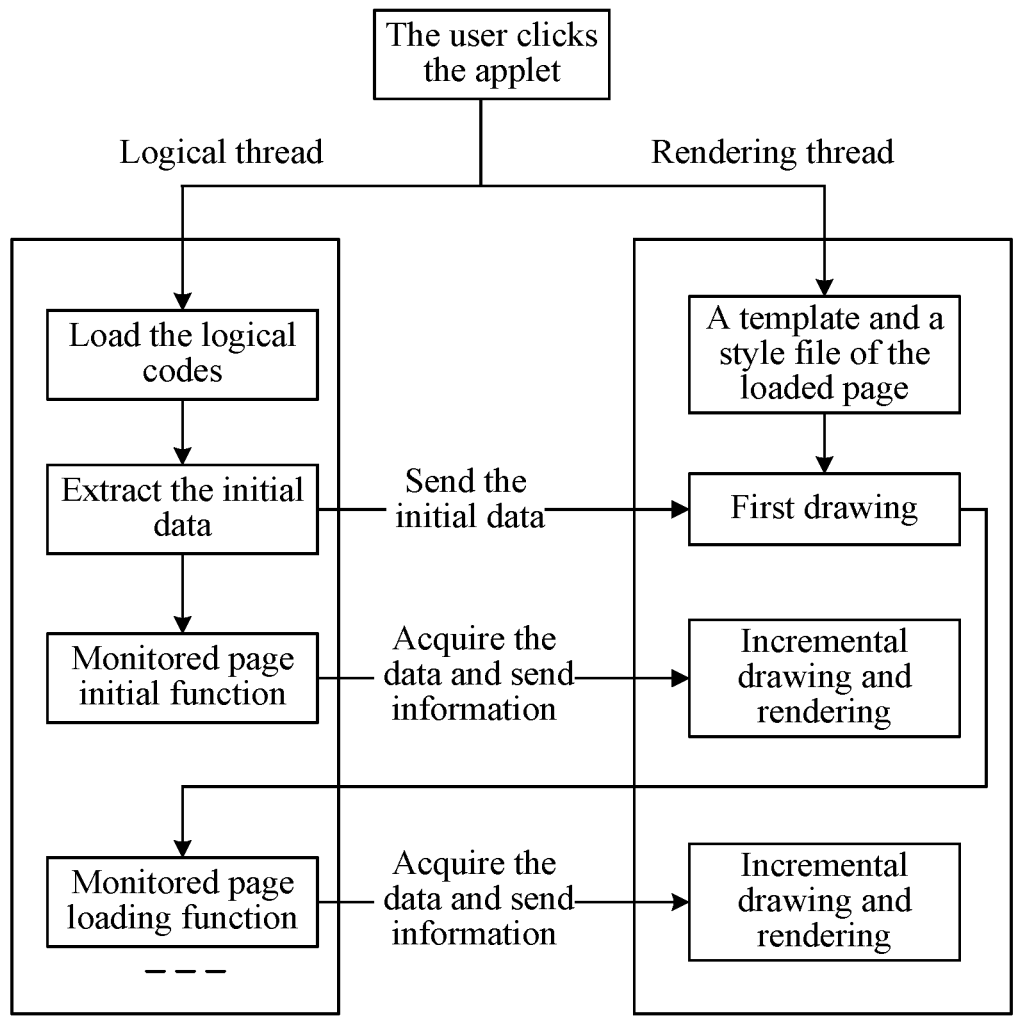
FIG. 3 is a schematic diagram showing a start-up flow of life cycles according to an embodiment of the present application.

FIG. 3 is a schematic diagram showing a start-up flow of life cycles according to an embodiment of the present application. As shown in FIG. 3, the electronic device may load the logical codes and the page style file of the applet page through the logical thread and the rendering thread in response to the instruction of the user to open the applet page to obtain the loading result of the logical codes of the applet page and the loading result of the page style file of the applet page, extract the initial data (initData) for rendering the applet page from the loading result of the logical codes of the applet page through the logical thread, send the initial data (initData) for rendering the applet page to the rendering thread through the logical thread, perform the first drawing on the applet page through the rendering thread based on the loading result of the page style file of the applet page and the initial data (initData) for rendering the applet page to obtain the first drawing result of the applet page, and then send the first drawing result of the applet page to the logical thread through the rendering thread; the logical thread triggers and executes onLoad based on the first drawing result of the applet page. In the present application, a monitored page initial function (onInit) is added to the life cycles, that is, page-level life cycles includes: onInit, onLoad, onShow, onReady and onUnload. The logical thread sends a setData message respectively to the rendering thread with regard to each of the preceding functions, and the rendering thread performs incremental drawing and rendering on the applet page respectively after receiving each setData message. For example, with regard to onInit, the logical thread sends a setData message corresponding to onInit to the rendering thread; and after receiving the setData message corresponding to onInit, the rendering thread performs incremental drawing and rendering based on the setData message corresponding to onInit. For another example, with regard to the onLoad, the logical thread sends a setData message corresponding to onLoad to the rendering thread; and after receiving the setData message corresponding to onLoad, the rendering thread performs incremental drawing and rendering based on the setData message corresponding to onLoad.

Figure 4:
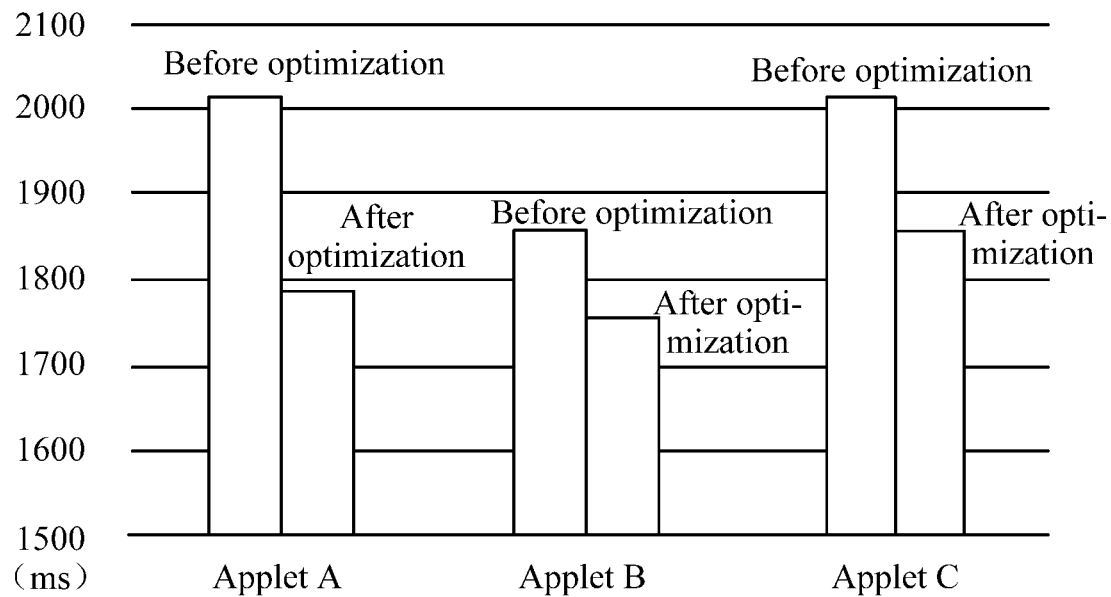
FIG. 4 is a schematic diagram showing a rendering effect of an applet page according to an embodiment of the present application.

FIG. 4 is a schematic diagram showing a rendering effect of an applet page according to an embodiment of the present application. As shown in FIG. 4, according to the technical solution, that is, requesting data of the page in the life cycle of onInit, provided by the present application, the loading of the page is greatly accelerated, and the performance of the page is improved. In the embodiment, the life cycle is used on three applet products, that is, applet A, applet B and applet C, respectively. The applet A can obtain a gain of 210 ms, the applet B can obtain a gain of 100 ms, and the applet C can obtain a gain of 150 ms.

According to the method for applet page rendering provided by the embodiment of the present application, original incremental rendering is performed on an applet page based on a pre-obtained first drawing result of the applet page to obtain an original incremental rendering result of the applet page; and then rendering is performed on the applet page based on the pre-obtained first drawing result of the applet page, the original incremental rendering result of the applet page and a pre-obtained initial incremental rendering result of the applet page. That is to say, in the present application, an initial incremental rendering result of the applet page may be pre-obtained, and then the rendering is performed on the applet page based on the pre-obtained first drawing result of the applet page, the original incremental rendering result of the applet page and the initial incremental rendering result of the applet page. In the present application, a function onInit is added to life cycles composed of onLoad, onShow, onReady and onUnload. Through onInit, part of the codes in onLoad can be pre-executed, without having to put codes whose execution depends on the first drawing result and codes whose execution does not depend on the first drawing result both in onLoad, while in a method for applet page rendering without adding the function onInit, the codes whose execution depends on the first drawing result and the codes whose execution does not depend on the first drawing result are both put in onLoad to execute. In the present application, the technical means is adopted in which the codes whose execution does not depend on the first drawing result is pre-executed through onInit, so that the problem in the related art is solved that only after the rendering thread completes first drawing and returns the drawing result to the logical thread, the logical thread will trigger and execute onLoad, resulting in a relatively-late triggering occasion of onLoad, seriously slowing down the final rendering of the page content, and affecting the user experience. According to the technical solution provided by the present application, the loading of the applet page is greatly accelerated, the page performance is improved, and the user experience is optimized. In addition, the technical solution of the embodiment of the present application is simple and convenient to implement, convenient to popularize, and have a wider range for application.

Embodiment Three

Figure 5:
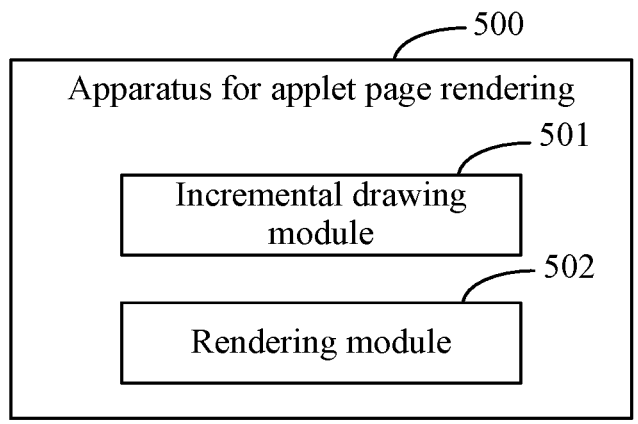
FIG. 5 is a structural diagram of an apparatus for applet page rendering according to an embodiment of the present application.

FIG. 5 is a structural diagram of an apparatus for applet page rendering according to an embodiment of the present application. As shown in FIG. 5, the apparatus 500 includes an incremental drawing module 501 and a rendering module 502. The incremental drawing module 501 is configured to perform original incremental rendering on an applet page based on a pre-obtained first drawing result of the applet page to obtain an original incremental rendering result of the applet page. The rendering module 502 is configured to perform rendering on the applet page based on the pre-obtained first drawing result of the applet page, the original incremental rendering result of the applet page and a pre-obtained initial incremental rendering result of the applet page.

The incremental drawing module 501 is configured to generate a message for triggering the original incremental rendering on the applet page based on the pre-obtained first drawing result of the applet page, and perform original incremental drawing and rendering on the applet page based on the message for triggering the original incremental rendering on the applet page to obtain the original incremental rendering result of the applet page.

The apparatus further includes a first drawing module 503 (not shown in the figure). The first drawing module 503 is configured to in response to an instruction of a user to open the applet page, load logical codes and a page style file of the applet page to obtain a loading result of the logical codes of the applet page and a loading result of the page style file of the applet page, extract initial data for rendering the applet page from the loading result of the logical codes of the applet page, and perform, based on the loading result of the page style file of the applet page and the initial data for rendering the applet page, first drawing on the applet page to obtain a first drawing result of the applet page.

The incremental drawing module 501 is further configured to generate a message for triggering initial incremental rendering on the applet page, and perform initial incremental drawing and rendering on the applet page based on the message for triggering the initial incremental rendering on the applet page to obtain an initial incremental rendering result of the applet page.

The incremental drawing module 501 is configured to generate the message for triggering the initial incremental rendering on the applet page in a following manner: acquiring data for generating the message for triggering the initial incremental rendering on the applet page in a server, and generating the message for triggering the initial incremental rendering on the applet page based on the data of the message for triggering the initial incremental rendering on the applet page.

The incremental drawing module 501 is configured to perform the initial incremental drawing and rendering on the applet page to obtain the initial incremental rendering result of the applet page in a following manner: in a case where the first drawing result of the applet page is not obtained when the message for triggering the initial incremental rendering on the applet page is received, sending the message for triggering the initial incremental rendering on the applet page to a cache queue, and performing the initial incremental drawing and rendering on the applet page based on the cache queue to obtain the initial incremental rendering result of the applet page; in a case where the first drawing result of the applet page is obtained when the message for triggering the initial incremental rendering on the applet page is received, directly performing the initial incremental drawing and rendering on the applet page based on the message for triggering the initial incremental rendering on the applet page to obtain the initial incremental rendering result of the applet page.

The preceding apparatus for applet page rendering can execute the method provided by any embodiment of the present application and has functional modules and beneficial effects corresponding to the executed method. For technical details not described in detail in the embodiment, reference may be made to the method for applet page rendering provided by any embodiment of the present application.

Embodiment Four

According to the embodiments of the present application, the present application further provides an electronic device, a readable storage medium and a computer program product.

Figure 6:
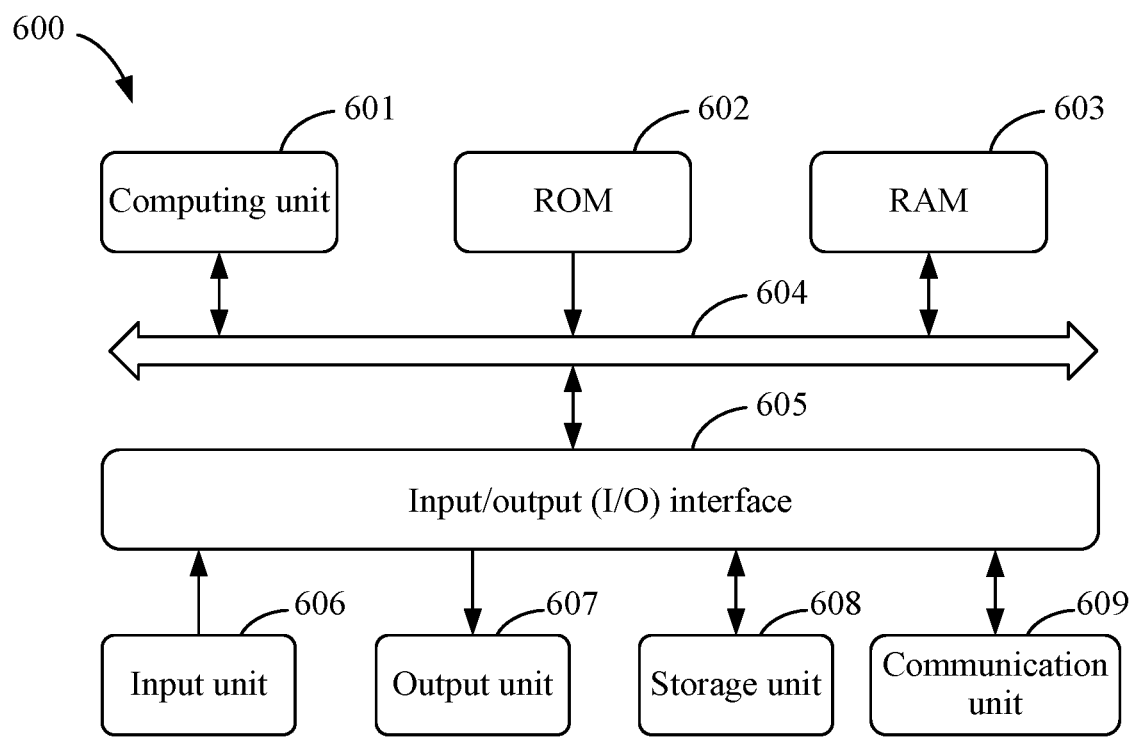
FIG. 6 is a block diagram of an electronic device for implementing a method for applet page loading according to an embodiment of the present application.

FIG. 6 is a block diagram of an electronic device for implementing a method for applet page loading according to an embodiment of the present application. Electronic devices 600 are intended to represent multiple forms of digital computers, for example, laptop computers, desktop computers, worktables, personal digital assistants, servers, blade servers, mainframe computers and other applicable computers. Electronic devices 600 may also represent multiple forms of mobile apparatuses, for example, personal digital assistants, cellphones, smartphones, wearable devices and other similar computing apparatuses. Herein the shown components, the connections and relationships between these components, and the functions of these components are illustrative only and are not intended to limit the implementation of the present application as described and/or claimed herein.

As shown in FIG. 6, the device 600 includes a computing unit 601. The computing unit 601 may perform multiple types of appropriate operations and processing based on a computer program stored in a read-only memory (ROM) 602 or a computer program loaded from a storage unit 608 to a random-access memory (RAM) 603. The RAM 603 may also store multiple programs and data required for the operation of the electronic device 600. The computing unit 601, the ROM 602 and the RAM 603 are connected to each other through a bus 604. An input/output (I/O) interface 605 is also connected to the bus 604.

Multiple components in the electronic device 600 are connected to the I/O interface 605. The multiple components include an input unit 606 such as a keyboard and a mouse, an output unit 607 such as multiple types of displays and speakers, the storage unit 608 such as a magnetic disk and an optical disk, and a communication unit 609 such as a network card, a modem and a wireless communication transceiver. The communication unit 609 allows the device 600 to exchange information/data with other devices over a computer network such as the Internet and/or multiple telecommunications networks.

The computing unit 601 may be a general-purpose and/or special-purpose processing component having multiple processing and computing capabilities. Some examples of the computing unit 601 include, but are not limited to, central processing units (CPUs), graphics processing units (GPUs), multiple special-purpose artificial intelligence (AI) computing chips, multiple computing units running machine learning models and algorithms, digital signal processors (DSPs) and any suitable processor, controller and microcontroller. The computing unit 601 performs the methods and processing described above, such as the method for applet page rendering. For example, in some embodiments, the method for applet page rendering may be implemented as a computer software program tangibly contained in a machine-readable medium such as the storage unit 608.

In some embodiments, part or all of computer programs may be loaded and/or installed on the electronic device 600 via the ROM 602 and/or the communication unit 609. When the computer programs are loaded to the RAM 603 and executed by the computing unit 601, one or more steps of the preceding method for applet page rendering may be performed. Alternatively, in other embodiments, the computing unit 601 may be configured, in any other suitable manner (for example, by means of firmware), to perform the method for applet page rendering.

The various embodiments of the systems and techniques described herein may be implemented in digital electronic circuitry, integrated circuitry, a field-programmable gate array (FPGA), an application-specific integrated circuit (ASIC), application specific standard parts (ASSP), a system on a chip (SoC), a complex programmable logic device (CPLD), computer hardware, firmware, software and/or a combination thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus and at least one output apparatus and transmitting data and instructions to the memory system, the at least one input apparatus and the at least one output apparatus.

Program codes for implementation of the method of the present application may be written in any combination of one or more programming languages. These program codes may be provided for a processor or controller of a general-purpose computer, a special-purpose computer or another programmable data processing apparatus such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present application, the machine-readable medium may be a tangible medium that may contain or store a program available for an instruction execution system, apparatus or device or a program used in conjunction with an instruction execution system, apparatus or device. The machine-readable medium may be a machine-readable signal medium or a machine-readable storage medium. Machine-readable media may include, but are not limited to, electronic, magnetic, optical, electromagnetic, infrared or semiconductor systems, apparatuses or devices or any suitable combination thereof. Examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order that interaction with a user is provided, the systems and techniques described herein may be implemented on a computer. The computer has a display apparatus for displaying information to the user, such as a cathode-ray tube (CRT) or a liquid-crystal display (LCD) monitor, and a keyboard and a pointing apparatus such as a mouse or a trackball through which the user can provide input to the computer. Other types of apparatuses may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in conventional physical host and virtual private server (VPS) services.

Various forms of the preceding flows may be used, with steps reordered, added, or removed. For example, the steps described in the present application may be executed in parallel, in sequence or in a different order as long as the desired results of the technical solutions provided by the present application are achieved. The execution sequence of these steps is not limited herein.

What is claimed is:

1. A method for applet page rendering, comprising:
performing original incremental rendering on an applet page based on a pre-obtained first drawing result of the applet page to obtain an original incremental rendering result of the applet page; and
performing rendering on the applet page based on the pre-obtained first drawing result of the applet page, the original incremental rendering result of the applet page and a pre-obtained initial incremental rendering result of the applet page;
wherein before performing the original incremental rendering on the applet page based on the pre-obtained first drawing result of the applet page to obtain the original incremental rendering result of the applet page, the method further comprising:
in response to an instruction of a user to open the applet page, loading logical codes and a page style file of the applet page to obtain a loading result of the logical codes of the applet page and a loading result of the page style file of the applet page;
extracting initial data for rendering the applet page from the loading result of the logical codes of the applet page; and
performing, based on the loading result of the page style file of the applet page and the initial data for rendering the applet page, first drawing on the applet page to obtain the pre-obtained first drawing result of the applet page.

2. The method according to claim 1, wherein performing the original incremental rendering on the applet page based on the pre-obtained first drawing result of the applet page to obtain the original incremental rendering result of the applet page comprises:
generating a message for triggering the original incremental rendering on the applet page based on the pre-obtained first drawing result of the applet page; and
performing original incremental drawing and rendering on the applet page based on the message for triggering the original incremental rendering on the applet page to obtain the original incremental rendering result of the applet page.

3. The method according to claim 1, after extracting the initial data for rendering the applet page from the loading result of the logical codes of the applet page, further comprising:
generating a message for triggering initial incremental rendering on the applet page; and
performing initial incremental drawing and rendering on the applet page based on the message for triggering the initial incremental rendering on the applet page to obtain an initial incremental rendering result of the applet page.

4. The method according to claim 3, wherein generating the message for triggering the initial incremental rendering on the applet page comprises:
acquiring data for generating the message for triggering the initial incremental rendering on the applet page in a server; and
generating the message for triggering the initial incremental rendering on the applet page based on the data for generating the message for triggering the initial incremental rendering on the applet page.

5. The method according to claim 3, wherein performing the initial incremental drawing and rendering on the applet page to obtain the initial incremental rendering result of the applet page comprises:
in a case where the first drawing result of the applet page is not obtained when the message for triggering the initial incremental rendering on the applet page is received, sending the message for triggering the initial incremental rendering on the applet page to a cache queue, and performing the initial incremental drawing and rendering on the applet page based on the cache queue to obtain the initial incremental rendering result of the applet page;
in a case where the first drawing result of the applet page is obtained when the message for triggering the initial incremental rendering on the applet page is received, performing the initial incremental drawing and rendering on the applet page based on the message for triggering the initial incremental rendering on the applet page to obtain the initial incremental rendering result of the applet page.

6. An electronic device, comprising:
at least one processor; and
a memory communicatively connected to the at least one processor, wherein the memory is configured to store instructions executable by the at least one processor, and the instructions are executed by the at least one processor to cause the at least one processor to perform the following steps:
performing original incremental rendering on an applet page based on a pre-obtained first drawing result of the applet page to obtain an original incremental rendering result of the applet page; and
performing rendering on the applet page based on the pre-obtained first drawing result of the applet page, the original incremental rendering result of the applet page and a pre-obtained initial incremental rendering result of the applet page;
wherein the at least one processor is configured to further perform, before performing the original incremental rendering on the applet page based on the pre-obtained first drawing result of the applet page to obtain the original incremental rendering result of the applet page, the following steps:
in response to an instruction of a user to open the applet page, loading logical codes and a page style file of the applet page to obtain a loading result of the logical codes of the applet page and a loading result of the page style file of the applet page;
extracting initial data for rendering the applet page from the loading result of the logical codes of the applet page; and
performing, based on the loading result of the page style file of the applet page and the initial data for rendering the applet page, first drawing on the applet page to obtain the pre-obtained first drawing result of the applet page.

7. The electronic device according to claim 6, wherein the at least one processor is configured to perform the original incremental rendering on the applet page based on the pre-obtained first drawing result of the applet page to obtain the original incremental rendering result of the applet page by:
generating a message for triggering the original incremental rendering on the applet page based on the pre-obtained first drawing result of the applet page; and
performing original incremental drawing and rendering on the applet page based on the message for triggering the original incremental rendering on the applet page to obtain the original incremental rendering result of the applet page.

8. The electronic device according to claim 6, wherein the at least one processor is configured to further perform, after extracting the initial data for rendering the applet page from the loading result of the logical codes of the applet page, the following steps:
generating a message for triggering initial incremental rendering on the applet page; and
performing initial incremental drawing and rendering on the applet page based on the message for triggering the initial incremental rendering on the applet page to obtain an initial incremental rendering result of the applet page.

9. The electronic device according to claim 8, wherein the at least one processor is configured to generate the message for triggering the initial incremental rendering on the applet page by:
acquiring data for generating the message for triggering the initial incremental rendering on the applet page in a server; and
generating the message for triggering the initial incremental rendering on the applet page based on the data for generating the message for triggering the initial incremental rendering on the applet page.

10. The electronic device according to claim 8, wherein the at least one processor is configured to perform the initial incremental drawing and rendering on the applet page to obtain the initial incremental rendering result of the applet page by:
in a case where the first drawing result of the applet page is not obtained when the message for triggering the initial incremental rendering on the applet page is received, sending the message for triggering the initial incremental rendering on the applet page to a cache queue, and performing the initial incremental drawing and rendering on the applet page based on the cache queue to obtain the initial incremental rendering result of the applet page;
in a case where the first drawing result of the applet page is obtained when the message for triggering the initial incremental rendering on the applet page is received, performing the initial incremental drawing and rendering on the applet page based on the message for triggering the initial incremental rendering on the applet page to obtain the initial incremental rendering result of the applet page.

11. A non-transitory computer-readable storage medium, storing computer instructions for causing a computer to perform the following steps:
performing original incremental rendering on an applet page based on a pre-obtained first drawing result of the applet page to obtain an original incremental rendering result of the applet page; and
performing rendering on the applet page based on the pre-obtained first drawing result of the applet page, the original incremental rendering result of the applet page and a pre-obtained initial incremental rendering result of the applet page;
wherein the computer is configured to further perform, before performing the original incremental rendering on the applet page based on the pre-obtained first drawing result of the applet page to obtain the original incremental rendering result of the applet page, the following steps:
in response to an instruction of a user to open the applet page, loading logical codes and a page style file of the applet page to obtain a loading result of the logical codes of the applet page and a loading result of the page style file of the applet page;
extracting initial data for rendering the applet page from the loading result of the logical codes of the applet page; and
performing, based on the loading result of the page style file of the applet page and the initial data for rendering the applet page, first drawing on the applet page to obtain the pre-obtained first drawing result of the applet page.

12. The storage medium according to claim 11, wherein the computer is configured to perform the original incremental rendering on the applet page based on the pre-obtained first drawing result of the applet page to obtain the original incremental rendering result of the applet page by:
generating a message for triggering the original incremental rendering on the applet page based on the pre-obtained first drawing result of the applet page; and
performing original incremental drawing and rendering on the applet page based on the message for triggering the original incremental rendering on the applet page to obtain the original incremental rendering result of the applet page.

13. The storage medium according to claim 11, wherein the computer is configured to further perform, after extracting the initial data for rendering the applet page from the loading result of the logical codes of the applet page, the following steps:
generating a message for triggering initial incremental rendering on the applet page; and
performing initial incremental drawing and rendering on the applet page based on the message for triggering the initial incremental rendering on the applet page to obtain an initial incremental rendering result of the applet page.

14. The storage medium according to claim 13, wherein the computer is configured to generate the message for triggering the initial incremental rendering on the applet page by:
- acquiring data for generating the message for triggering the initial incremental rendering on the applet page in a server; and
- generating the message for triggering the initial incremental rendering on the applet page based on the data for generating the message for triggering the initial incremental rendering on the applet page.

15. The storage medium according to claim 13, wherein the computer is configured to perform the initial incremental drawing and rendering on the applet page to obtain the initial incremental rendering result of the applet page by:
- in a case where the first drawing result of the applet page is not obtained when the message for triggering the initial incremental rendering on the applet page is received, sending the message for triggering the initial incremental rendering on the applet page to a cache queue, and performing the initial incremental drawing and rendering on the applet page based on the cache queue to obtain the initial incremental rendering result of the applet page;
- in a case where the first drawing result of the applet page is obtained when the message for triggering the initial incremental rendering on the applet page is received, performing the initial incremental drawing and rendering on the applet page based on the message for triggering the initial incremental rendering on the applet page to obtain the initial incremental rendering result of the applet page.

* * * * *